(12) United States Patent
Zacharias et al.

(10) Patent No.: US 9,894,023 B2
(45) Date of Patent: Feb. 13, 2018

(54) IMAGE FEEDING SERVER NETWORK

(71) Applicant: Zebrafish Labs, Inc., San Francisco, CA (US)

(72) Inventors: Christopher Zacharias, San Francisco, CA (US); Jeremy Larkin, Concord, CA (US); David Birdsong, San Francisco, CA (US)

(73) Assignee: Zebrafish Labs, Inc., San Francisco, CA (US)

( * ) Notice: Subject to any disclaimer, the term of this patent is extended or adjusted under 35 U.S.C. 154(b) by 215 days.

(21) Appl. No.: 14/332,063

(22) Filed: Jul. 15, 2014

(65) Prior Publication Data
US 2016/0021041 A1   Jan. 21, 2016

(51) Int. Cl.
 *G06F 13/00* (2006.01)
 *H04L 12/58* (2006.01)
 *H04L 29/08* (2006.01)

(52) U.S. Cl.
CPC ............ *H04L 51/10* (2013.01); *H04L 67/101* (2013.01); *H04L 67/1023* (2013.01); *H04L 67/322* (2013.01); *H04L 67/06* (2013.01)

(58) Field of Classification Search
CPC ........ G06Q 30/02; G06Q 50/24; G06Q 50/22; G06Q 40/08; G06Q 10/10; H04L 29/06; H04L 29/0809; H04L 29/06047; H04L 29/08072; H04L 67/06; H04L 67/10; H04L 67/101; H04L 67/322; H04L 67/1023; G06F 19/322
USPC ............................................. 705/3; 709/203
See application file for complete search history.

(56) References Cited

U.S. PATENT DOCUMENTS

| 6,950,849 B1 | 9/2005 | Brandstätter et al. |
| 7,493,030 B2 * | 2/2009 | Kakkori ................. G03B 7/093 348/207.99 |
| 8,675,219 B2 * | 3/2014 | Kim .................... G06K 9/00973 358/1.15 |

(Continued)

FOREIGN PATENT DOCUMENTS

EP   2365675 A1   9/2011

OTHER PUBLICATIONS

International Search Report and Written Opinion dated Feb. 11, 2016, for International Application No. PCT/US2015/040650, 10 pages.

*Primary Examiner* — Robert B Harrell
(74) *Attorney, Agent, or Firm* — Perkins Coie LLP

(57) ABSTRACT

Technology is disclosed for feeding source images from image stores of client systems into an image processing system using image feeding servers ("the technology"). The technology includes multiple image feeding servers that can feed a source image to the image processing system, using which the image processing system can generate processed images to be served to end users. The image feeding servers can be installed at various locations, e.g., geographically spread, and more proximate to where the source images are stored. An image feeding server obtains the source image from the image store in original size, downsizes the source image, and transmits the downsized source image to the image processing system. The technology selects an image feeding server based on a score of the image feeding server. The score can be determined as a function of one or more image feeding server parameters, e.g., latency, workload, or computing resource.

30 Claims, 9 Drawing Sheets

(56) References Cited

U.S. PATENT DOCUMENTS

2008/0133271 A1\* 6/2008 Chang .................... G06F 9/505
                                                    705/3
2013/0212211 A1   8/2013 Maigatter et al.
2014/0115020 A1\* 4/2014 Colaco ............. G06F 17/30194
                                                    707/827

\* cited by examiner

IMAGE FEEDING SERVER NETWORK

TECHNICAL FIELD

Several of the disclosed embodiments relate to image processing, and more particularly, to feeding an image from a source to an image processing system for just-in-time image processing of the image.

BACKGROUND

Online publishers publish various content including text, image, video and audio. An online publisher may want to publish a particular image in various color schemes, patterns, layouts, etc. For example, an online art merchant may want to publish a sculpture image captured using a camera online. However, the merchant may want to enhance the image in a particular way before the image is published online to demand a buyer's attention. The merchant may want to generate multiple images showing specific portions of the sculpture.

Current publishing techniques typically require the merchant to generate a version of the particular image for each of the different ways the merchant wishes to publish the image. For example, if the merchant wishes to highlight only the portion of the image having the sculpture, the surrounding portions of the sculpture in the image may have to be blurred. In another example, if the merchant wishes to show how the sculpture looks in a particular decor, the surrounding portions of the sculpture in the image may also have to be shown. This requires the merchant to have different version of the images which serves different purposes. This can be a time consuming process since all versions have to be generated before they are published.

Certain service providers provide image processing services to the online publishers. The image processing services typically obtain a source image from the online publisher and perform processing the source image to generate various versions of the image. The source images are typically large files, e.g., ranging from tens of megabytes to hundreds of megabytes. To transport such large image files from the online publisher systems to systems of the image processing services consume significant computing resources, e.g., network bandwidth, and can result in increased network consumption costs. The problem increases by many folds if the images published by the online publishers are changing often as the image processing system has to obtain the source images often. Further, in many cases such large source image files may not be necessary to generate the required processed images. For example, if the processed images are typically presented on smaller screen mobile devices, then obtaining the source image, which is a high resolution image and is of hundreds of megabytes may not be necessary and is not an efficient use of the computing resources of the image processing system.

DETAILED DESCRIPTION

Figure 1:
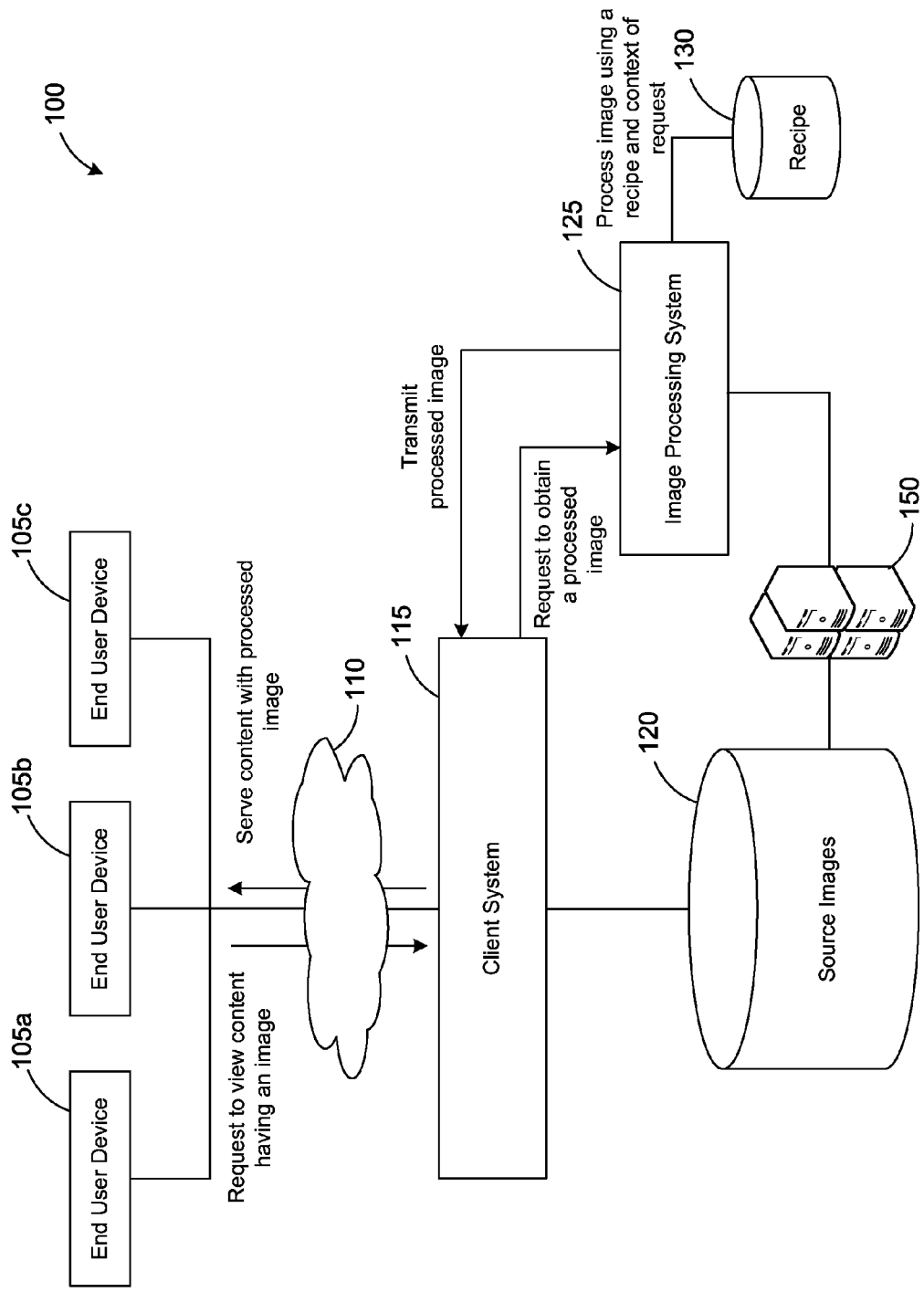
FIG. 1 illustrates an environment where an image processing system can be implemented.

Technology is disclosed for feeding an image to an image processing system for just-in-time processing of the image ("the technology"). Various embodiments of the technology include an image processing system for providing image processing services for clients who publish content, including a number of images, to users. In some embodiments, the image processing system processes the images upon receiving a request for retrieving the images associated with the content. That is, the image processing system processes the images just-in-time. For example, when the user accesses a website or an application ("app") of a client system for viewing the online content, the client system requests the image processing system to obtain the images associated with the content. The image processing system processes the images and returns the processed images to the client system, which further serves them to the requesting user device.

In some embodiments, processing an image includes executing a set of instructions (also referred to as a "recipe") on one or more original source images to render a processed image on the user device. Typically, the image processing system obtains the source image from the client system and uses it to generate one or more processed images.

Various embodiments of the technology include multiple image feeding servers that can feed a source image to the image processing system, using which the image processing system can generate the processed images. The image feeding servers can be installed at various locations, e.g., geographically spread, and more proximate to the client systems where the source images are stored. An image feeding server obtains the source image from the client system in original size, downsizes the source image, e.g., decreases the file size of the source image by decreasing a resolution of the source image, and transmits the downsized source image to the image processing system. The image processing system uses the downsized source image to generate one or more processed images, which can be served to end users accessing content published by the client system. In some embodiments, downsizing an image means reducing a file size of the image. The file size can be reduced in a number of ways, e.g., reducing the resolution, that is, the number of pixels of the image, changing a file format of the image file, compressing the image using various compression techniques, or reducing the number of colors in the image.

In some embodiments, in fetching a source image from a client system, the image processing system can choose an image feeding server that is most efficient, e.g., consumes the least amount of computing resources, to fetch the source image, downsize the source image to the specified file size and transmit the downsized image to the image processing system. For example, the image processing system can choose an image feeding server which is closest to the client system, that is, an image feeding server that has a least latency to the client system among all the image feeding servers. In another example, the image processing system can choose an image feeding server that has the most work capacity or the least work load among all the image feeding servers. In yet another example, the image processing system can choose an image feeding server based on the latency of the image feeding server and the work load of the image feeding server.

After a particular image feeding server is chosen, the image feeding server obtains the source image from the client system, downsizes the image and sends the downsized image to the image processing system over a high speed network. The latency of the high speed network is significantly lower than that of the latency of a network between the image processing system and an image store of the client system (where the client system stores the source images) in the absence of the image feeding servers. The latency between the particular image feeding server and the image store of the client system is also significantly lesser compared to the latency of a network between the image processing system and the client system in the absence of the image feeding servers.

Further, the combined latency between the image store of the client system and the particular image feeding server and between the particular image feeding server and the image processing system is still lesser than the latency of the network between the image processing system and the image store of the client system in the absence of the image feeding servers. Accordingly, the computing resources, e.g., network bandwidth, time, consumed in fetching the downsized source image to the image processing system is significantly less compared to obtaining the original source image in the absence of the image feeding servers.

The image processing system can further process the downsized image to generate one or more processed images as per client system's requirement and/or end user device's attributes. In some embodiments, the downsized image is large enough to generate any of the one or more processed images that may be presented to the end user device and small enough to be transmitted from the image store of the client system to the image processing system without significant consumption of computing resources. The image processing system can specify a target file size to which the source image has to be downsized to in the request sent to the image feeding server. In some embodiments, the target file size is a lowest possible file size of the source image using which a downsized image, which can be used to generate the above one or more processed images, can be generated.

In some embodiments, the image processing system processes the downsized image based on a recipe to render a processed image on the end user device. The recipe enables the processed images to be rendered on the end user device as per the preferences of a client system using the image processing system. For example, the recipe can specify that the processed images be rendered in a particular size, color scheme, layout, resolution, etc. The recipe can also specify that a portion of the processed image be highlighted, cropped, a particular color be enhanced, etc. In some embodiments, the recipe may be provided, at least in part, by the client system. The recipe may also be generated, at least in part, by the image processing system. The image processing system enables the client system to obtain various processed images for a given single original source image. In some embodiments, more than one source image may be used to render the processed image.

In some embodiments, the images are also processed based on a context of the request. The context of the request can include data regarding attributes of the end user device, e.g., a resolution of display, a size of the display, a type of the end user device—a smartphone, tablet, laptop, desktop, etc., an operating system on the end user device, ambient lighting, a network bandwidth available to the end user device etc. The image processing system renders the processed images based on the attributes of the device. For example, the images can be rendered in a particular resolution based on the resolution of the display of the display of the end user device. In another example, the brightness of the processed image may be adjusted based on the ambient lighting on the end user device. In some embodiments, the context of the request for obtaining the image is included in the request and/or provided by the client system.

In some embodiments, the image processing system can be implemented as a multi-tier architecture having various tiers of servers performing specific functions of the image processing system. Each of the tiers can have one or more servers. The image processing system can include a content delivery network having one or more tiers to receive a request for obtaining an image to be displayed at the end user device from a client system. The servers in the content delivery network can be spread across various geographical locations. The content delivery network receives the request from client systems in various geographical locations passes the request to a load balancing server tier if the processed images are not available at the content delivery network.

The load balancing server tier manages image processing requests from the client system by inserting them into a queue. The load balancing server tier receives the request from the content delivery network and inserts the request into the queue. An image processing server tier obtains an image processing request from the queue and generates a processed image. The processing includes retrieving one or more original source images and processing them based on the recipe and the context of the request to generate the processed image. The processed image is returned to the client system through the content delivery network and the client system further serves the processed image to the end user device.

In some embodiments, the image processing system also includes a source image server tier that is configured to obtain the original source images, e.g., downsized source images, from a source location using the image feeding servers, and store them at a source image cache associated with the source image server tier. In some embodiments, the image processing system generates a log file containing data related to the processing of the one or more requested images. The image processing system also includes a prediction server that can predict the different processed images that may be requested by the end user devices in the future. In some embodiments, the prediction server can use various prediction techniques, including statistical analysis, to determine a set of processed images that may be requested in the future based, at least in part, on the data in the log file.

In some embodiments, the image processing system provides an image editing tool (hereinafter referred to as a "visor") that generates a recipe for on-demand processing of images. The visor includes a graphical user interface (GUI) that provides various editing controls for performing various editing operations on an image. The client system can use the visor to edit the image. The visor generates a set of image processing instructions corresponding to the editing operations performed by the client system and transmits the set of image processing instructions, which form a recipe for generating a processed image, to the image processing system. The image processing system processes the image based on the recipe and transmits the processed image to the client system which further serves the processed image to the end users accessing the image.

In some embodiments, the image can be part of the content published by the client system. For example, the image can be part of content published via a webpage. In some embodiments, the image processing system generates the visor on the same webpage as the content having the image. By generating the visor on the same webpage as the content, the client system can edit the image on the webpage and view the resulting image as it will be seen by an end user accessing the content. This can help the client system in obtaining a perspective on whether the edited image may be pleasing to the end users' eyes and in determining whether or not to publish the edited image.

Environment

FIG. 1 illustrates an environment where an image processing system can be implemented. The environment 100 includes a client system 115 that publishes content, including images, which can be accessed by end users using end user devices such as end user devices 105a-c via a communication network 110. The end user devices can be a smartphone, a laptop, a desktop, a tablet PC, or any other suitable device for viewing content published by client system 115. The environment 100 also includes an image processing system 125 that receives a request from the client system 115 (e.g., on behalf of an end user device such as end user device 105a) for obtaining a processed image (of a source image) which is served to the end user device 105a with the content. The image processing system 125 obtains the source image and processes the source image to generate a processed image (also referred to as "rendered image"). The processed image is then returned to the client system 115 which further serves the processed image to the end user device 105a.

The source image most often provides the base image data used in producing a processed image. In some embodiments, one or more source images may be used in generating the processed image. In some embodiments, the image processing system 125 obtains the source image from a location such as an image store 120 specified by the client system 115 or from a cache associated with the image processing system 125 (not illustrated). The image store 120 can be any type of storage system including a database, file storage and/or any other convenient or known storage techniques. Further, the image store 120 can be part of the client system 115 or provided by any third party storage services, such as cloud storage from Box, Dropbox, Amazon, Google, etc., where the client system 115 stores the source images.

In some embodiments, the image processing system 125 obtains a downsized version of the source image and processes the downsized source image to generate the processed image. The image processing system 125 obtains the downsized version of the source image using one of the image feeding servers 150. One of the image feeding servers 150 obtains the source image in original file size from the image store 120, downsizes the source image to a target file size specified by the image processing system 125 and transmits the downsized source image to the image processing system 125. Additional details with respect to obtaining a downsized source image using the image feeding servers are described at least with reference to FIGS. 2-7.

The image processing system 125 processes the downsized source image based on a recipe for the particular image and/or a context of the request. The recipe includes a set of instructions to be executed on the source image to generate the processed image. The recipe can include instructions regarding at least one of (a) a target size of the image to be rendered, (b) a target resolution of the image to be rendered, (c) a target color pattern of the image to be rendered, (d) a target layout of the image with respect to other content with which the image is served, (e) a target brightness value, (f) a target contrast value, (g) a target saturation value, (h) a target portion of the image to be highlighted, or (i) a target area of the image to be cropped etc.

In some embodiments, the recipe can be provided by the client system 115. For example, the client system 115 can provide a recipe which instructs the image processing system 125 to crop an image to include only a portion of the image having faces of certain subjects. In another example, the recipe can instruct the image processing system 125 to crop a specific portion of the image if the image is rendered on a smartphone, but include a larger portion of the image when it is rendered on a laptop. In another example, the recipe can instruct the image processing system 125 to change a color pattern of the image in order to match with a webpage with which the image is displayed or to highlight/enhance a particular color of the image to grab attention from the end user.

In some embodiments, the recipe can also be generated by the image processing system 125. For example, the image processing system 125 can determine based on historical data, which of the colors when enhanced in the image received more attention from the users (determined based on, e.g., a number of clicks) and enhance the color of the image and/or other images in the webpage accordingly. The recipe can be stored in a storage system such as a recipe store 130. In some embodiments, the recipe store 130 can be implemented as various storage systems including a database, a file system and/or any other convenient or known storage techniques.

In some embodiments, the recipe can also take into consideration a context of the request. The context of the request can include an attribute of the end user device 105a, such as (a) a type of the end user device 105a, (b) a size of a display of the end user device 105a, (c) a resolution of the display of the end user device 105a, (d) an operating system of the end user device 105a, (e) ambient lighting of the end user device 105a etc. For example, if the end user device 105a has a display with resolution higher than a predefined resolution, then the recipe can instruct the image to be rendered in a resolution higher than a predefined resolution. In some embodiments, the image processing system 125 can have a predefined range of resolutions at which the processed image can be rendered. In another example, if the end user device 105a has a display with resolution lower than a predefined resolution, then the recipe can instruct the image to be rendered in low resolution. In another example, the brightness of the image can be changed based on the ambient lighting condition on the end user device 105a.

Further, in some embodiments, the context of the request can also include network bandwidth availability between the end user device 105a and the client system 115. For example, if the network bandwidth is below a predefined threshold, the recipe can instruct the image processing system 125 to render a low resolution image. The context of the request can be included in the request and/or provided by the client system 115 independent of the request.

In some embodiments, various recipes can be used to generate various processed images for a particular image. The client system 115 may provide access to at least one source image to the image processing system 125 and request the image processing system 125 to return one or more processed images for the source image. For example, for a given image by the client system 115, various processed images such as a high resolution image, a low resolution image, an image with a particular color enhanced, an image with a particular color scheme, brightness, saturation or hue etc. can be generated using the corresponding recipe. In some embodiments, a given recipe can be reused for processing various images. For example, a default recipe can process one or more images. The default recipe can be for enhancing the colors, brightness, saturation, etc. of the one or more images.

The image processing system 125 enables the client system 115 to obtain various processed images for a given single image. This minimizes the resources required for maintaining various versions of the images by the client system 115. However, in some embodiments, more than one source image may be used to render a processed image, for example, a derivative image. A derivative image is a kind of rendered image that depends on one or more original source images. For example, an image of a logo may be superimposed onto another image to obtain the derivative image. In embodiments where the image processing system 125 renders a derivative image, the image processing system 125 may retrieve the necessary original source images from the image store 120.

The content published by the client system 115 can include text, video, audio, or any other multi-media content. The content can be published in many ways, including websites, applications (also known as "apps"). The content can be accessed by the end users in a number of ways, e.g., via web browsers, or apps which when executed on an end user device display the content.

Figure 8:
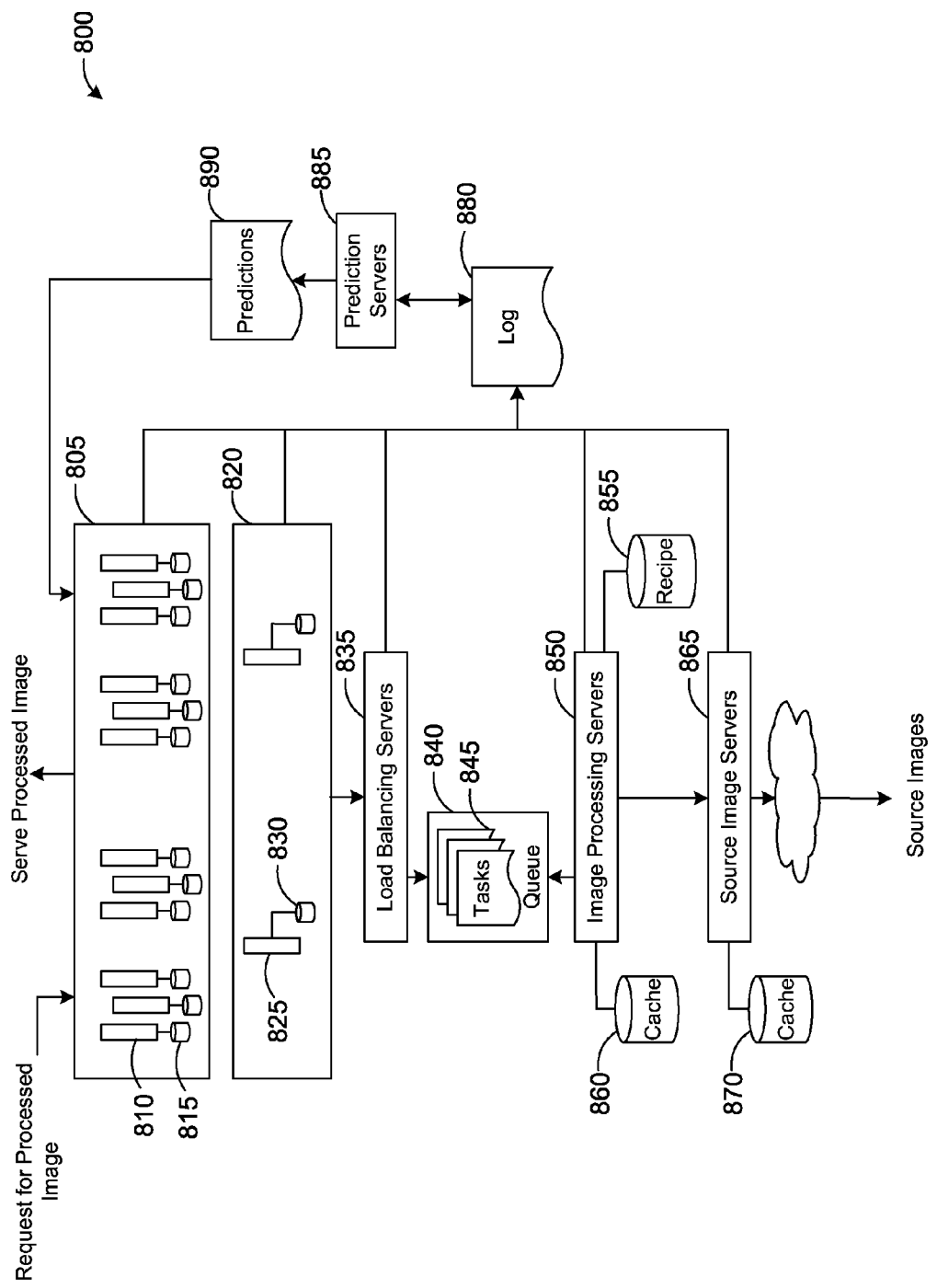
FIG. 8 illustrates a block diagram of an image processing system implemented as a multi-tier architecture, consistent with various embodiments.

In some embodiments, the image processing system 125 can be implemented as a multi-tier architecture having various tiers of servers performing specific functions of the image processing system 125. One such example multi-tier implementation of the image processing system 125 is illustrated in FIG. 8.

Figure 2:
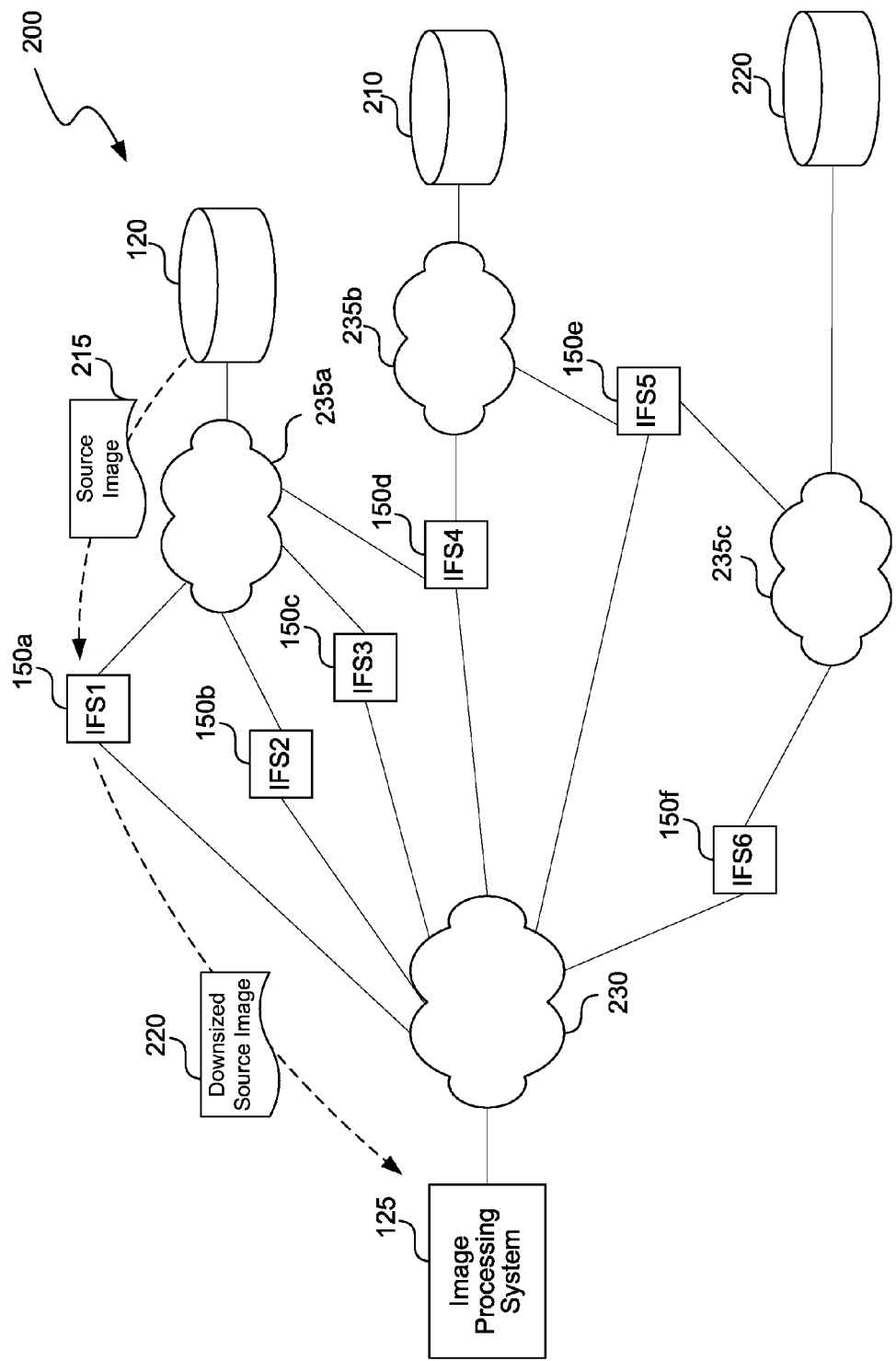
FIG. 2 illustrates a block diagram of a system for obtaining downsized source images using image feeding servers, consistent with various embodiments of the disclosed technology.

FIG. 2 illustrates a block diagram of a system 200 for obtaining downsized source images using image feeding servers, consistent with various embodiments. The system 200 may be implemented in the environment 100 of FIG. 1. The system 200 includes multiple image feeding servers, e.g., image feeding servers 150a-f (referred to as image feeding servers 150), that can feed downsized source images to the image processing system 125. The image processing system 125 generates a job request for obtaining a source image, e.g., source image 215, advertises it to the image feeding servers 150, and assigns it to one of the image feeding servers 150, e.g., image feeding server 150a. The image feeding server obtains the source image from the particular image store, e.g., image store 120, in original size, downsizes the source image, and transmits the downsized source image, e.g., downsized source image 220, to the image processing system. By way of example, a source image can be 200 MB and the corresponding downsized image can be 100 KB. In some embodiments, the image processing system 125 generates the job request for obtaining the source image 215, when the source image 215 (or the corresponding downsized image 220) for generating a processed image in response to a request from the client system is not stored at the image processing system 125.

In some embodiments, the image feeding servers 150 are geographically spread and can be located near image storage systems, e.g., image stores 120, 210, and 220, of one or more clients. To assign the job request to an image feeding server, the image processing system 125 selects a particular image feeding server based on one or more factors, e.g., proximity (or connection time or latency) to a particular image store from the which the source image has to be fetched. For example, to fetch the source image 215 from the image store 120, the image processing system 125 can select the image feeding server 150a that is in proximity/has lowest connection time to the image store 120. After obtaining the source image from the image store 120, the image feeding server 150a downsizes the source image and transmits the downsized source image 220 to the image processing system 125. The following paragraphs describe additional details with respect to the process of selecting a particular image feeding server to obtain a source image from a particular image store.

The image processing system 125 selects an image feeding server based on a server score of the image feeding server. The server score is indicative of a match of the image feeding server to perform the job advertised. The server score can be determined as a function of one or more image feeding server parameters, e.g., latency, workload, computing resource, of an image feeding server. In some embodiments, the server score is determined as a function of latency between a particular image feeding server and a particular image store from which the source image is to be obtained. Latency is a time interval between the stimulation and response, or a time taken for a data packet to travel from source to destination and back. In some embodiments, the lower the latency, the higher the server score.

For example, for obtaining a source image from image store 120, the image feeding server 150a can be the most proximate image feeding server to the image store 120 and therefore, can have a least latency to the image store 120 among the image feeding servers 150 and consequently, the highest score. Accordingly, the image processing system 125 can select the image feeding server 150a to obtain the source image from the image store 120. In another example, with respect to image store 210, the image feeding server 150e may have a least latency to the image store 210 among the image feeding servers 150. Accordingly, the image processing system 125 can select the image feeding server 150e to obtain the source image from the image store 210. In some embodiments, the server score of an image feeding server can be different for different image stores as the image feeding server can have different latencies with different image stores, e.g., as the image stores may be in different regions.

In some embodiments, the server score is determined as a function of the workload (or available capacity) of the image feeding server. In some embodiments, the lesser the work load (that is, higher the available capacity) of the image feeding server, the higher the server score. The work load of the image feeding server can be determined as a function of number of tasks, e.g., downsizing tasks, the image feeding server is performing and a file size of the source image being downsized in each of the downsizing tasks. For example, if two image feeding servers have substantially same latencies to a particular image store, the image processing system 125 can select one of the two image feeding servers that has a lesser work load, or in other words, has a higher capacity.

In some embodiments, the server score is determined as a function of the computing resources of an image feeding server, e.g., processor speed, available memory. In some embodiments, the lesser the computing resources of an image feeding server, the lesser the server score of the image feeding server.

Various combinations of the above factors can be considered in determining the server score of the image feeding server. Further, each of the above factors can be weighted, that is, different factors can have different weights in determining the score. After the scores of all the image feeding servers are determined, the image processing system 125 selects an image feeding server whose server score is the highest or exceeds a predefined threshold and instructs the selected image feeding server to obtain the source image from the image store, downsize the source image and transmit the downsized source image to the image processing system.

The image processing system 125 can implement various methods for selecting an image feeding server using the score. In a first method, the image processing system 125 generates a job request for obtaining a source image from a particular image store, e.g., image store 120. The image processing system 125 broadcasts a request for response requesting the image feeding servers to respond with their scores for the job request. Each of the image feeding servers 150 determine their image feeding server parameter values for the job request, e.g., latency with the image store 120, workload and computing resources, calculate their scores as a function of the image feeding server parameters, and transmit their scores to the image processing system 125. In some embodiments, the image feeding servers may transmit the image feeding server parameter values instead of the scores to the image processing system 125, and the image processing system 125 may determine the scores using the image feeding server parameter values. The image processing system 125 identifies an image feeding server, e.g., image feeding server 150a, that has the highest server score or a server score which exceeds the predefined threshold, and instructs the identified image feeding server to transmit the downsized source image to the image processing system 125.

In a second method, the image feeding servers 150 may advertise their scores or the image feeding server parameter values to the image processing system 125 on a periodic basis or based on a trigger. The trigger can be occurrence of an event, such as expiry of an interval since the last transmission of the score, receiving a request for the server score from the image processing system 125, the work load of the image feeding server dropping below a predefined threshold, etc. In some embodiments, since the latency of an image feeding server can vary for different image stores, the server score of the image feeding server can also vary. Accordingly, an image feeding server can determine its server score (or image feeding server parameter values) for each of the image stores in the system 200, generate a set of scores (or image feeding server parameter values) and transmit the set of scores to the image processing system 125. Each of the image feeding servers can transmit their corresponding set of scores to the image processing system 125. When the image processing system 125 generates a job request for obtaining a source image from a particular image store, the image processing system 125 checks the scores stored at the image processing system 125 and identifies an image feeding server that has the highest server score or a server score which exceeds the predefined threshold for the particular image store. The image processing system 125 then instructs the identified image feeding server obtain the source image from the particular image store, downsize the source image and transmit the downsized source image to the image processing system 125.

In some embodiments, the job request can also include a target file size of the downsized source image, that is, the file size to which the source image has to be downsized. The image processing system 125 determines the target file size such that the downsized source image of the target file size can be used to generate a number of processed images that may be served to the end user. In some embodiments, the target file size is determined such that the downsized image is large enough to be used for generating a combination of processed images that may be requested by the client system for serving to the end user and small enough to be transmitted from the image store to the image processing system 125 without consuming significant computing resources.

The image processing system 125 communicates with the image feeding servers 150 over a first communication network 230 and the image feeding servers 150 communicate with image stores over communication networks 235a-c (referred to as second communication network 235). Both the communication networks have low latencies. In some embodiments, the first communication network 230 is a high speed network and therefore, the latency between with the image processing system 125 and the image feeding servers 150 is relatively low. Also, in some embodiments, since an image feeding server that is in proximity to a particular image store is chosen to obtain the source image from the particular image store, the latency between the image feeding server and the particular image store can be significantly less compared to the latency of the network between the image processing system 125 and the image stores in the absence of the image feeding servers 150.

Further, the combined latencies of both the communication networks is still less compared to the latency between the image processing system 125 and the image stores in the absence of the image feeding servers 150. Accordingly, the computing resources consumed in having one of the image feeding servers 150 obtain the source image from the image store, downsize the source image and transmit the downsized source image to the image processing system 125 can be significantly less compared to that consumed in having the image processing system 125 obtain the source image in original file size from the image store without the image feeding servers 150.

Figure 3:
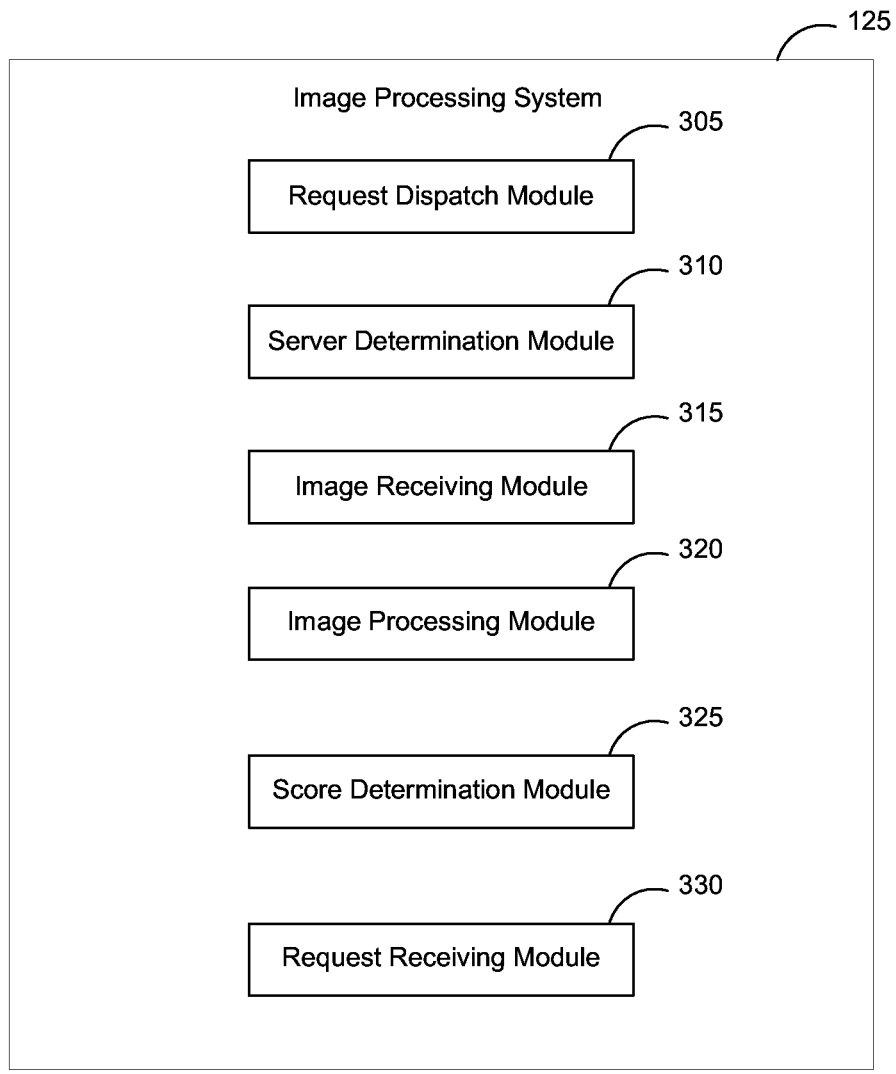
FIG. 3 is a block diagram of an image processing system of FIG. 1, consistent with various embodiments.

FIG. 3 is a block diagram of an image processing system of the FIG. 1. The image processing system 125 includes a request dispatch module 305, a server determination module 310, an image receiving module 315, an image processing module 320, a server score determination module 325 and a request receiving module 330. In some embodiments, the image processing system 125 is implemented as a distributed computing system.

The request receiving module 330 receives a request from a client system, e.g., client system 115, to serve a processed image to an end user device accessing the content containing the processed image. The image processing module 320 determines whether a source image required for generating the processed image is stored at the image processing system 125. If the source image is stored at the image processing system 125, the image processing module 320 processes the source image to generate the processed image and serves the processed image to the end user device. If the source image is not stored at the image processing system 125, the request dispatch module 305 generates a job request for obtaining a downsized source image.

The job request can include location information of the image store of a client system from which an image feeding server has to obtain the source image. In some embodiments, the location information can include IP (Internet Protocol) address of an image store such as image store 120. The job request can also include a target file size to which the source image obtained from the image has to be downsized to before being transmitted to the image processing system 125. The request dispatch module 305 dispatches the job request to multiple image feeding servers, e.g., image feeding servers 150, seeking their response to the job request.

The server determination module 310 determines an image feeding server to which the job request has to be assigned based on the responses received from the image feeding servers. The server determination module 310 selects an image feeding server based on a server score of the image feeding server. The server determination module 310 selects an image feeding server having a server score that is highest among the scores of all the image feeding servers or that exceeds a predefined threshold.

The response from the image feeding servers can include scores of the image feeding servers or image feeding server parameters that is used to determine the scores. In some embodiments, the responses include scores of the image feeding servers. The server determination module 310 retrieves the scores from the responses and identifies the image feeding server with the highest server score or a server score that exceeds a predefined threshold. In some embodiments, the responses include image feeding server parameters, e.g., a latency of the image feeding server to the particular image feeding server, a workload of the image feeding server or a computing resource of the image feeding server. The server determination module 310 retrieves the image feeding server parameter values and requests a server score determination module 325 to determine a server score of each of the servers as a function of the image feeding server parameter values. After determining the scores, the server determination module 310 identifies the image feeding server with the highest server score or a server score that exceeds a predefined threshold.

Referring back to the server score determination module 325, the server score determination module 325 sends a message to each of the image feeding servers 150 to determine a server score and report back the server score to the image processing system 125. In some embodiments, the server score determination module 325 requests the image feeding servers to determine a server score of the corresponding image feeding server based on latency between the corresponding server and the image storage of the client system. In some embodiments, the server score determination module 325 requests the image feeding servers to determine a server score of the corresponding server based on a number of downsizing jobs being performed by the corresponding server and a file size of a specified source image which is being downsized in each of the downsizing jobs.

After the server determination module 310 identifies the image feeding server, the request dispatch module 305 assigns the request to the identified image feeding server. The image feeding server obtains the source image from the particular image store, downsizes the source image and transmits the source image to the image processing system 125. The image receiving module 315 receives the downsized source image from the image feeding server and stores the downsized source image at a storage device associated with the image processing system 125.

After receiving the downsized source image, the image processing module 320 processes the downsized source image to generate a processed image based on the client system, which requested the processed image, and/or a context of the request from the end user device accessing the content containing the processed image.

Figure 4:
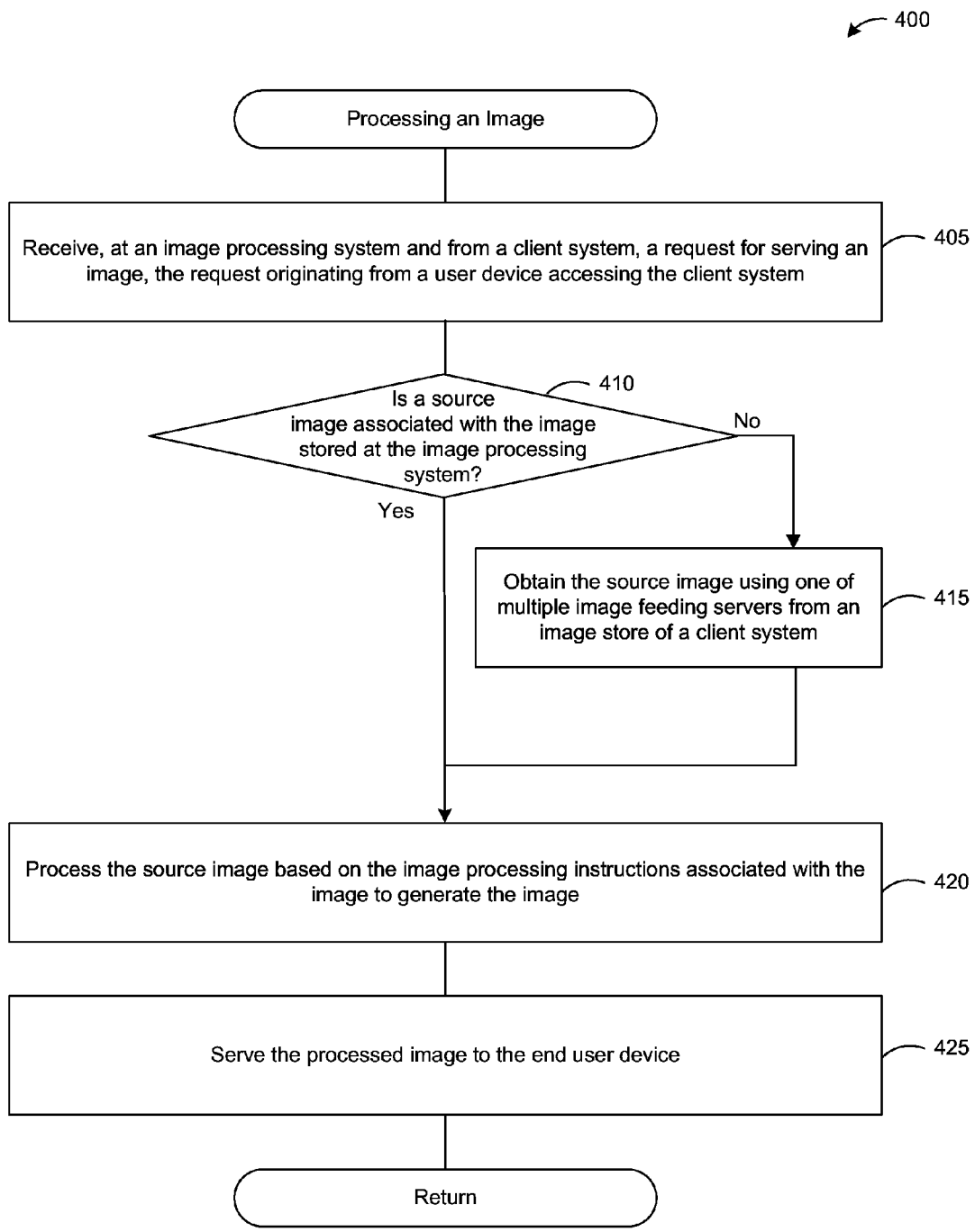
FIG. 4 is a flow diagram of a process for processing an image, consistent with various embodiments.

FIG. 4 is a flow diagram of a process for processing an image, consistent with various embodiments. In some embodiments, the process 400 may be implemented in an environment such as environment 100 of FIG. 1. At step 405, a request receiving module 330 of an image processing system 125 receives a request from a client system, such as client system 115, for obtaining a processed image for a particular image. In some embodiments, the request can be originated from an end user device, such as end user device 105*a* accessing content published by the client system 115. For example, the request can be generated when the end user device 105*a* accesses a URL of a website of the client system 115 having the processed image.

At determination step 410, the image processing module 320 determines if a source image required for generating the processed image is stored at the image processing system 125. Responsive to a determination that the source image is not stored at the image processing system 125, at step 415, the request dispatch module 305 sends a request to an image feeding server to obtain the source image from the image store where the client system stores the original source images, and the process 400 proceeds to step 420. In some embodiments, the image feeding server downsizes the source image obtained from the image store before transmitting it to the image processing system 125. Responsive to a determination that the source image is stored at the image processing system 125, at step 420, the image processing module 320 identifies a recipe for generating the processed image and processes the downsized source image based on the recipe to generate the processed image.

In some embodiments, processing the image includes rendering the image based on (a) a target size, (b) a target resolution, (c) a target color pattern, (d) a target layout of the image with respect to other content with which the image is served, (e) a target brightness value, (f) a target contrast value, or (g) a target saturation value. The processing can also include highlighting a target portion of the image or cropping a target area of the image, recognizing a face in the image, performing predefined image editing operations on the recognized face etc.

Further, the above processing can also be dependent on a context of the request from the end user, e.g., an attribute of the end user device 105*a* such as (a) a type of the end user device 105*a*, (b) a size of a display of the end user device 105*a*, (c) a resolution of the display of the end user device 105*a*, (d) an operating system of the end user device 105*a*, (e) ambient lighting of the end user device 105*a* etc. For example, if the end user device 105*a* has a display with a resolution higher than a predefined resolution, then the recipe can include instructions to render the image in high resolution. In another example, if the end user device 105*a* has a display with resolution lower than a predefined resolution, then the recipe can include instructions to render the image in low resolution. In another example, the brightness of the image can be changed based on the ambient lighting condition on the end user device 105*a*.

At step 425, the image processing module 320 transmits the processed image to the client system 115, which serves the processed image to the end user device 105*a*. For example, the processed image is served with the content in response to the end user device 105a accessing the URL of the website of the client system 115.

Figure 5:
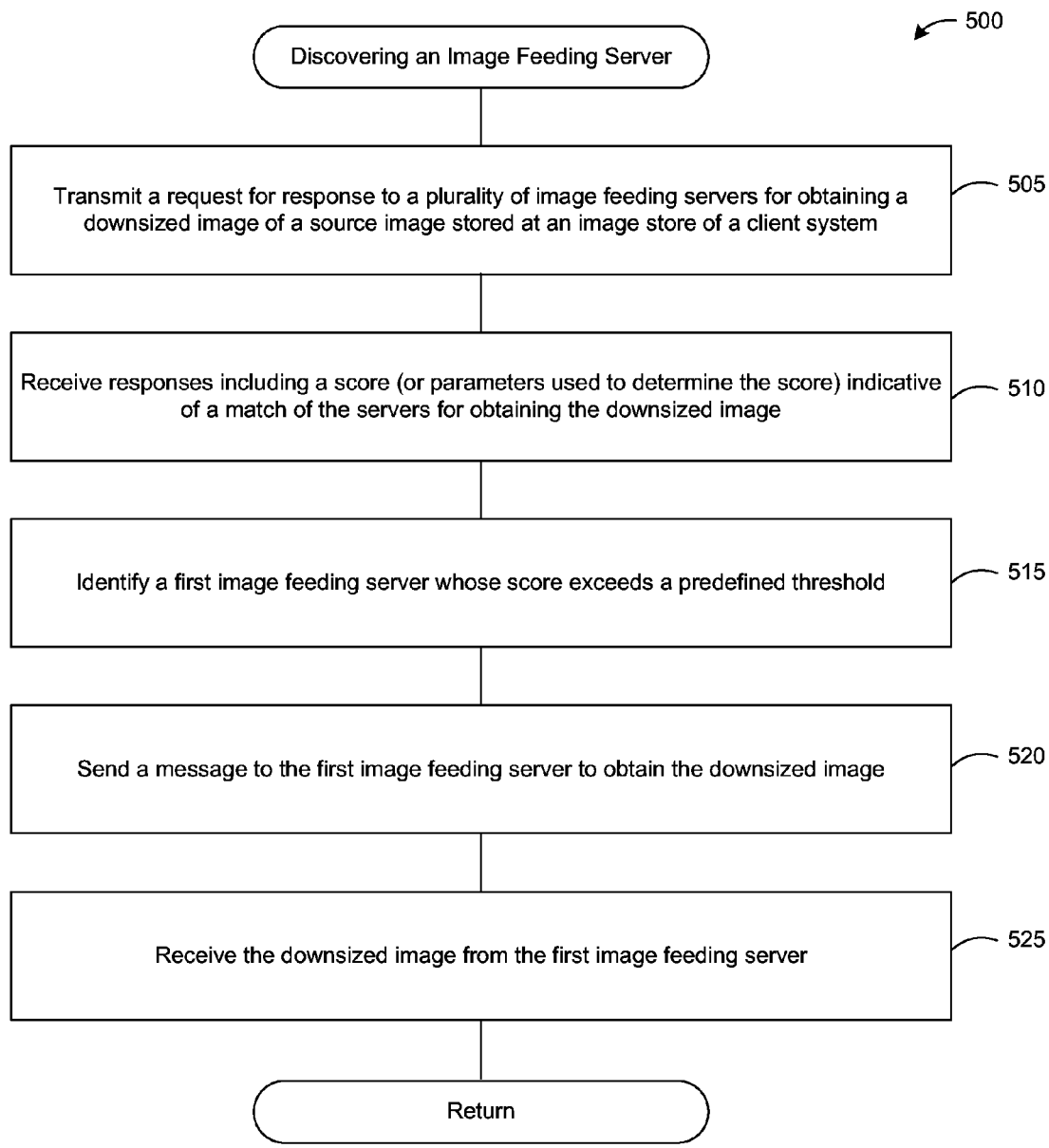
FIG. 5 is a flow diagram of a process for selecting an image feeding server to obtain the downsized source image, consistent with various embodiments.

FIG. 5 is a flow diagram of a process for selecting an image feeding server to obtain the downsized source image, consistent with various embodiments. In some embodiments, the process 500 may be implemented in the environment 100 of FIG. 1. At step 505, the request dispatch module 305 of an image processing system 125 generates a job request for obtaining the downsized source image. In some embodiments, the request dispatch module 305 generates the job request at step 415 of process 400, when the image processing module 320 determines that a source image required for generating the processed image is not stored at the image processing system 125.

The job request can include location information of the image store of a client system, such as image store 120 associated with client system 115, from which an image feeding server has to obtain the source image. In some embodiments, the location information can include IP address of the image store. The job request can also include a target file size to which the source image obtained from the image has to be downsized to before being transmitted to the image processing system 125. The request dispatch module 305 dispatches the job request to multiple image feeding servers, e.g., image feeding servers 150, seeking their response to the job request.

At step 510, the server determination module 310 receives responses from the image feeding servers. The response from the image feeding servers can include scores of the image feeding servers or image feeding server parameters that is used to determine the scores. The server score is indicative of a match of the image feeding server to perform the job advertised. The server score can be determined as a function of one or more image feeding server parameters, e.g., latency, workload, computing resource, of an image feeding server, which is further described at least with reference to process 700 of FIG. 7 below. In some embodiments, the responses include scores of the image feeding servers. In some embodiments, the responses include image feeding server parameters, e.g., a latency of the image feeding server to the particular image feeding server, a workload of the image feeding server or a computing resource of the image feeding server. The server determination module 310 retrieves the image feeding server parameter values and requests a server score determination module 325 to determine a server score of each of the servers as a function of the image feeding server parameter values.

After the scores are retrieved from the responses or determined based on the image server parameter values in the responses, at step 515, the server determination module 310 identifies the image feeding server with the highest server score or a server score that exceeds a predefined threshold.

At step 520, the request dispatch module 305 assigns the request to the identified image feeding server. The image feeding server obtains the source image from the particular image store, downsizes the source image and transmits the source image to the image processing system 125. At step 525, the image receiving module 315 receives the downsized source image from the image feeding server and stores the downsized source image at a storage device associated with the image processing system 125.

Figure 6:
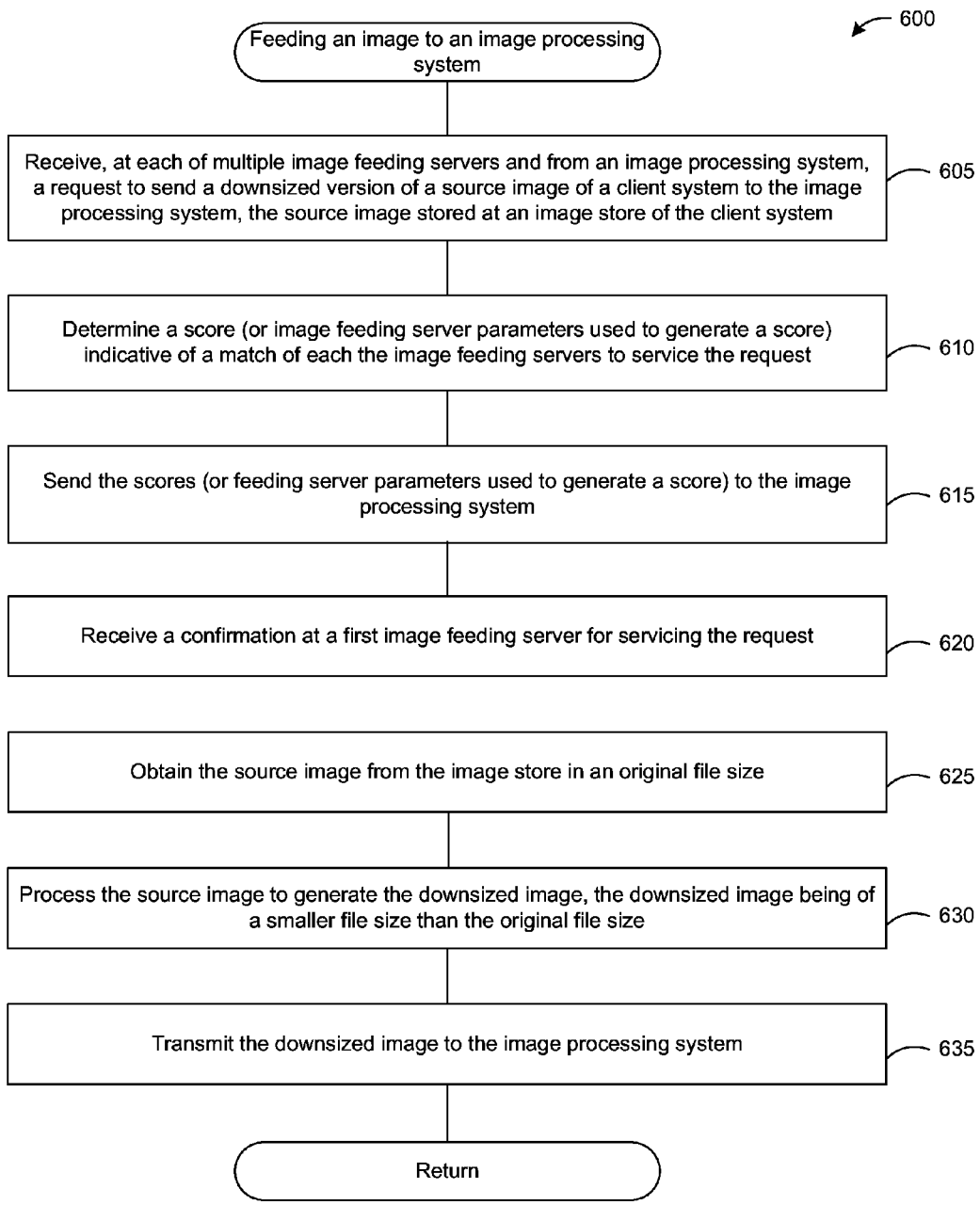
FIG. 6 is a flow diagram of a process for feeding a downsized source image to an image processing system, consistent with various embodiments.

FIG. 6 is a flow diagram of a process 600 for feeding a downsized source image to an image processing system, consistent with various embodiments of the disclosed technology. The process 600 can be executed in an environment 100 of FIG. 1. At step 605, each of the image feeding servers, e.g., image feeding servers 150, receive a job request dispatched from the request dispatch module 305. As described with reference to step 605 of process 600, the job request can include location information of the source image, location information of the image store of a client system, e.g., IP address of the image store, from which an image feeding server has to obtain the source image. The job request can also include a target file size to which the source image obtained from the image store has to be downsized to before being transmitted to the image processing system 125.

At step 610, each of the image feeding servers determine a server score or image feeding server parameters used to generate the server score for servicing the job request. The server score can be determined as a function of one or more image feeding server parameters, e.g., latency, workload, computing resource, of an image feeding server, which is further described at least with reference to process 700 of FIG. 7 below. At step 615, the image feeding servers send their scores or image feeding server parameters to the image processing system 125.

The image processing system 125 determines the image feeding server with the highest server score or a server score that exceeds a predefined threshold and the image processing system 125 assigns the job request to the identified image feeding server. At step 620, the image feeding server obtains a confirmation from the image processing system for servicing the job request. At step 625, the image feeding server obtains the source image from the image store. At step 630, the image feeding server downsizes the source image to the target file size and at step 635, transmits the downsized source image to the image processing system 125.

Figure 7:
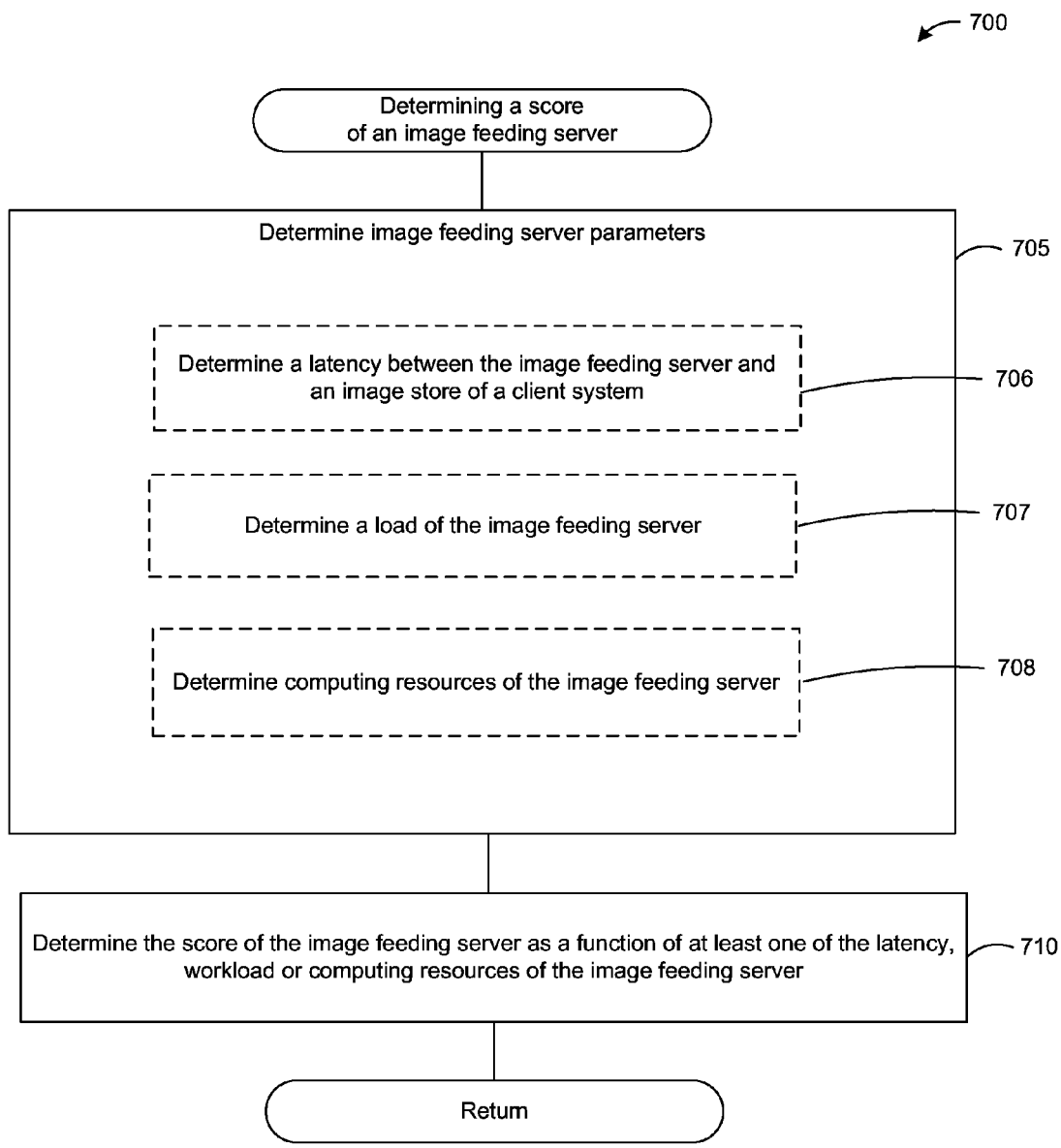
FIG. 7 is a flow diagram of a process for determining a score of an image feeding server, consistent with various embodiments.

FIG. 7 is a flow diagram of a process 700 for determining a server score of an image feeding server, consistent with various embodiments of the disclosed technology. The process 700 can be executed in an environment 100 of FIG. 1. A server score of the image feeding server is indicative of a match of the image feeding server to perform the job advertised by the image processing system.

The server score can be determined as a function of one or more image feeding server parameters. At step 705, the one or more image feeding server parameters are determined. In some embodiments, the image feeding server parameters can include latency, workload, or computing resource of an image feeding server. Determining the server parameters can include determining a latency between a particular image feeding server and a particular image store from which the source image is to be obtained (step 706), determining a workload (or available capacity) of the image feeding server (step 707) and determining computing resources of the image feeding server, e.g., processor speed, available memory (step 708). It should be noted that the image feeding server parameters discussed in steps 706-708 are examples, and that other image feeding server parameters or job based parameters, e.g., file size of the source image to be fetched, can be considered for determining the server score of the image feeding server.

After the image feeding server parameters are determined, at step 710, the server score of the image feeding server is determined as a function of the image feeding server parameters. Each of the image feeding server parameters can be weighted, that is, different image feeding server parameters can have different weights in determining the score.

Referring back to determining the latency of an image feeding server, latency is a time interval between the stimulation and response, or a time taken for a data packet to travel from source to destination and back. In some embodiments, the lower the latency the higher the score. For example, for obtaining a source image from image store 120, the image feeding server 150*a* can be the most proximate image feeding server to the image store 120 and therefore, can have a least latency to the image store 120 among the image feeding servers 150 and consequently, the highest score. In some embodiments, the server score of an image feeding server can be different for different image stores as the image feeding server can have different latencies for different image stores.

Referring back to determining the workload of an image feeding server, the work load of the image feeding server can be determined as a function of number of tasks, e.g., downsizing tasks, the image feeding server is performing and a file size of the source image being downsized in each of the downsizing tasks. For example, if two image feeding servers have substantially same latencies to a particular image store, the image processing system 125 can select one of the two image feeding servers that has a lesser work load, or in other words, has a higher capacity to perform the current job request. The lesser the work load of the image feeding server, the higher the server score of the image feeding server.

Referring back to determining the computing resources of an image feeding server, the lesser the available computing resources at an image feeding server, the lesser the server score of the image feeding server. For example, in determining a server score for two image feeding servers, one with a faster processor and/or more memory than the other is likely to have a higher server score than the other.

Note that the determination of server score can be performed by either each of the image feeding servers or the image processing system 125. If the image feeding servers are determining their scores, steps 705-710 may be performed by each of the image feeding servers. If the image processing system is determining the score, each of the image feeding servers may determine their corresponding image feeding server parameters, e.g., as described in steps 705-708, and transmit them to the image processing system, which determines the scores based on the image feeding server parameters.

FIG. 8 illustrates a block diagram of an image processing system 800 implemented as a multi-tier architecture, consistent with various embodiments. The image processing system 800 includes various server tiers such as edge server tier 805, a shield server tier 820, load balancing server tier 835, an image processing server tier 850 and a source image server tier 865. In some embodiments, the image processing system 125 of FIG. 1 can be implemented as the image processing system 800, and in the environment 100.

Each of the tiers can have one or more servers. A server can be either a physical computer in a data center, or a virtual instance of a computer in cloud infrastructure. A server typically receives requests for work, performs or distributes the work, and then returns a response. The edge server tier 805 can receive requests from a client system such as client system 115 (e.g., on behalf of an end user) for obtaining processed images. For example, when the end user accesses the content published by the client system 115, which includes the processed image, the edge server tier 805 receives the request from the client system 115 to obtain the processed image. The edge server tier 805 includes multiple servers, such as edge server 810, and one or more associated caches, such as edge cache 815. In some embodiments, each of the edge servers in the edge server tier 805 has an associated edge cache as illustrated in FIG. 8. However, in some embodiments, the edge cache 815 may be associated with more than one edge server.

In some embodiments, the edge servers in the edge server tier 805 may be located in various geographical locations. The edge servers may be configured to serve requests from predefined geographical locations. When a request arrives at the edge server tier 805 from a client system, the request is routed to an edge server that is configured to serve the geographical location in which the particular client system is located. For example, while edge server 810 may be configured to serve requests from geographical locations A, B and C, another edge server may be configured to serve requests from geographical locations X, Y, and another edge server may be configured to serve requests from geographical location Z. That is, the edge servers in the edge server tier 805 act as a closest point of contact of the image processing system 800 for the client systems.

When a request is received at the edge server tier 805 from the client system 115 at a geographical location A, the edge server 810 checks whether the edge cache 815 has the processed image. If the edge cache 815 has the processed image, the edge server 810 serves the processed image to the client system 115, which further serves the processed image to the end user's device, such as end user device 105*a*. If the edge cache 815 does not contain the processed image, the edge server tier 805 passes the request to the shield server tier 820.

The shield server tier 820 includes multiple servers, such as shield server 825, and associated shield cache 830. In some embodiments, the shield servers in the shield server tier 820 can be distributed across various geographical regions. In some embodiments, a geographical region includes a number of geographical locations. The shield servers can be configured to receive requests from a group of edge servers in a particular geographical region. In some embodiments, the shield server tier 820 can have a shield server for every "x" number of edge servers, where "x" is a number configurable by a user, such as an administrator of the image processing system 800. The shield cache 830 can be associated with one or more shield servers, and the shield server tier 820 can have one or more shield caches.

When a shield server, such as shield server 825, receives the request from an edge server, such as edge server 810, the shield server 825 determines whether the shield cache 830 contains the processed image. If the shield cache can contains the processed image, the shield server 825 obtains the processed image from the shield cache 830 and returns the image to the edge server 810 which further serves the processed image to the client system 115. If the shield cache 830 does not contain the processed image, the shield server 825 passes the request to the load balancing server tier 835.

In some embodiments, the edge server tier 805 can bypass the shield server tier 820 and pass the request to the load balancing server tier 835 directly if the processed image is not available at the edge cache 815. However, typically, the edge server tier 805 determines whether the processed image is available at the shield server tier 820 before the request is passed to the load balancing server tier 835. In some embodiments, the time consumed for the determination, by the edge server, of whether a shield server contains the processed image is not significant because the edge server and the shield server can share the same communication network.

The load balancing server tier 835 receives the image processing requests 845 from the edge server tier 805 and/or shield server tier 820 and inserts them into a queue 840. An image processing server of the image processing server tier

850 fetches a request from the queue 840 and processes the request to generate a processed image. In some embodiments, the load balancing server tier 835 balances a load of the image processing system 800 by inserting the requests into the queue 840 and not assigning them directly to the image processing servers in the image processing server tier 850 upon receipt of a request at the load balancing server tier 835. The image processing server can pick up a request from the queue 840 when the image processing server is available to process a request.

In some embodiments, the load balancing server tier 835 determines whether a particular request is a valid request for an image before inserting the request into the queue 840. In some embodiments, the validity of the request can be determined by determining whether a signature of an image for which the request is received matches with the any of the signatures maintained at the image processing system 800. If the particular request is valid, the load balancing server tier 835 inserts it into the queue 840.

The image processing server tier 850 obtains an image processing request (also referred to as "a task") for a particular image from the queue 840 and processes the particular image based on a recipe for the particular image and the context of the request. The image processing server tier 850 determines whether the particular image, that is, an original source image provided by the client system 115 is available at the image processing server cache 860. If the original source image is available at the image processing server cache 860, the image processing server tier 850 obtains the image from the image processing server cache 860 and processes the original source image to generate the processed image. If the original source image is not available at the image processing server cache 860, the image processing server cache 860 requests the source image server tier 865 to obtain the original source image. The source image server tier 865 obtains the original source image and returns it to the image processing server tier 850 for processing the original source image. The image processing server tier 850 may store the received original source image at the image processing server cache 860.

In some embodiments, the source image server tier 865 obtains the original source image from a location specified by the client system 115, for example, at storage such as the image store 120. The source image server tier 865 obtains the original source image from the image store 120 via image feeding servers, e.g., image feeding servers 150, and returns the original source image to the image processing server tier 850. In some embodiments, the source image server tier 865 itself can be the image feeding servers 150. In some embodiments, the source image server tier 865 obtains a downsized version of the source image. The source image server tier 865 can also store the retrieved original source image at the source image cache 870. In some embodiments, obtaining the original source image from the image store 120 can consume significant amount of computing resources, especially in cases where the image store 120 is implemented as cloud storage service, for a number of reasons including performing authentication operations, performing read operations from a slow storage medium such as a hard drive etc. Accordingly, in order to minimize the consumption of computing resources, the original source image retrieved by the source image server tier 865 may be stored at the source image cache 870.

Also, in some embodiments, the source image server tier 865 may, regardless of whether a request is received for obtaining a particular original source image, pre-fetch the original images from the image store 120 and store the original source images in the source image cache 870. The pre-fetching may be performed based on a predefined condition, for example, at a particular time of the day, day of the week, etc., or when the load on the image processing system 800 is below a predefined threshold. In some embodiments, the pre-fetching may help the source image server tier 865 to minimize the delay caused due to obtaining a particular source image from the image store 120, in serving a request for the particular original source image from the image processing server tier 850. The source image server tier 865 may refresh the source image cache 870, that is, add or delete original source images from the source image cache 870 based on predefined cache management policies.

Referring back to the image processing server tier 850, after obtaining the original source image, either from the image processing server cache 860 or from the source image server tier 865, the image processing server tier 850 identifies a recipe for the original source image and processes the original source image using the recipe and a context of the image processing request to generate a processed image. The recipe can be identified using various data including information regarding the client, the content being published (e.g., based on URL of a webpage of the content), information regarding attributes of an end user device from which the request is initiated etc. Any necessary information for determining the recipe for processing the original source image is provided to the image processing system 800, for example, via the request. In some embodiments, the information for determining the recipe may be provided by the client system 115 to the image processing system 800 independent of the request.

The recipe can be provided by the client and/or generated by the image processing system 800. The recipes can be stored at a storage system such as recipe storage system 855. In some embodiments, the recipe storage system 855 can be implemented as various storage systems, for example, a database, a file system and/or any other convenient or known storage techniques.

The recipe includes a set of instructions to be executed on the original source image to render a processed image. The recipe can include instructions regarding at least one of (a) a target size of the image to be rendered, (b) a target resolution of the image to be rendered, (c) a target color pattern of the image to be rendered, (d) a target layout of the image with respect to other content with which the image is served, (e) a target brightness value of the image to be rendered, (f) a target contrast value of the image to be rendered, (g) a target saturation value of the image to be rendered, (h) a target portion of the image to be highlighted, or (i) a target area of the image to be cropped etc.

In some embodiments, the recipe can also be based on a context of the request. The context of the request can include an attribute of the end user device 105*a*. The attribute of the end user device 105*a* can include at least one of (a) a type of the end user device 105*a*, (b) a size of a display of the end user device 105*a*, (c) a resolution of the display of the end user device 105*a*, (d) an operating system of the end user device 105*a*, or (e) ambient lighting of the end user device 105*a* etc. In some embodiments, the recipe can be determined based on the context of the request. For example, if the end user device 105*a* has a display with a resolution higher than a predefined resolution, then the recipe can include instructions to render the image in high resolution. In another example, if the end user device 105*a* has a display with resolution lower than a predefined resolution, then the recipe can include instructions to render the image in low resolution. In another example, the brightness of the image can be changed based on the ambient lighting condition on the end user device 105*a*.

Further, in some embodiments, the context of the request can also include network bandwidth availability between the end user device 105*a* and the client system 115. For example, if the network bandwidth is below a predefined threshold, the recipe can include instructions to render a low resolution image.

After the original image is processed based on the recipe and the context of the request, the processed image is returned to the client system 115 which further serves the processed image to the end user device 105*a*.

In some embodiments, when the image processing server tier 850 returns the processed image to the client system 115, the processed image is transmitted to the client system 115 though one or more tiers, e.g., load balancing server tier 835, shield server tier 820 and edge server tier 805, above the image processing server tier 850. The one or more tiers may also store the received processed image in a cache associated with the corresponding server tier.

In some embodiments, the image processing server tier 850 can include different servers for performing different parts of processing the image. For example, tasks such as face recognition can be performed by a set of servers, changing a color scheme of a specific portion can be performed by another set of servers, cropping can be performed by another set of servers etc. The image processing server tier 850 can have logic, either in software, hardware, firmware or a combination, to assign a particular image processing operation to a particular server in the image processing server tier 850.

Further, in some embodiments, a particular image processing request can be split into a number of sub-tasks. For example, if a particular request requires face recognition and cropping, the face recognition operation and the cropping operation can be split into two tasks and added to the queue 840 as two sub-tasks. The face recognition task can be assigned to a server that performs face recognition task and the cropping task can be assigned to a server that performs the cropping operation. The final processed image can be rendered by combining the results of the sub-tasks or having each successive task work on the image resulting from the previous sub-task until all the sub-tasks are completed.

In some embodiments, one or more tiers of the image processing system 800 generate log 880 containing information at least regarding image processing requests and the image processing operations performed on the images. The log 880 can include information such as whether a particular processed image was available in a cache associated with a particular tier or was retrieved from a cache associated with a tier below the particular tier; performance metrics on rendering the processed image, e.g., time taken to render the processed image, memory consumed, a size of the original source image, how many source images were used to generate the processed image, time taken to load, wait or convert a particular image, a total response time in serving the processed image to the client system 115, response time of each tier, average time a particular task was in the queue 840, a number of tasks waiting in the queue at a given point of time, a point in time when the maximum queue size was reached, a time when evicting queue items were started etc.

In some embodiments, each of the one or more tiers can generate the log 880 separately. In some embodiments, the one or more tiers can generate information into a single log file 880. The log 880 includes information to identify which of the tiers generated particular information in the log 880.

In some embodiments, the image processing system 800 may use a logging system (not illustrated), e.g., real-time logging systems, to generate the log 880. The logging system can be provided by a third party.

In some embodiments, the information in the log 880 can be analyzed and used to enhance the performance of the image processing system 800. In some embodiments, the information in the log 880 can be used to predict image processing requests that may be received in the future and pre-render the processed images in advance. The pre-rendered images may be stored at a cache, such as edge server cache 815. When a predicted request is actually received at the edge server tier 805, the edge server 810 may obtain the processed image from the edge server cache 815 and return the processed image to the client system 115. By predicting the requests, processing the predicted request to rendered the processed image and storing the processed image at the cache in advance of receiving the actual request, the time consumed in obtaining the processed image when the actual request is received is minimized significantly. This enhances the user experience of the end user since the end user experiences minimum to near zero delay in the processed image being rendered on the end user device 105*a*.

In some embodiments, the image processing system 800 includes prediction servers 885 that generate predictions 890 having information regarding future image processing requests. The predictions 890 are input to the image processing system 800 via the edge server tier 805 (similar to the image processing requests from client system 115) which renders the processed images based on the predictions 890. In some embodiments, the image processing system 800 may schedule rendering of the processed images for the predictions 890 based on a predefined criterion. For example, image processing system 800 may decide to render the processed images for the predictions 890 when a load on the image processing system 800 is below a predefined threshold, at a particular time of the day, a particular time of the week, when a predefined number of requests have been received from a particular client system, etc.

The prediction servers 885 can generate the predictions 890 based on the information in the log 880 using various known prediction techniques. For example, the predictions 890 can be generated based on a statistical analysis of the information in the log 880. In another example, the prediction servers 885 can employ an expert system or a rule engine that can help in generating the predictions 890 based on the information in the log 880.

In some embodiments, one or more tiers of the image processing system 800 can be owned or operated by different entities. That is, the image processing system 800 can be a combination of various infrastructure provided by different entities.

Figure 9:
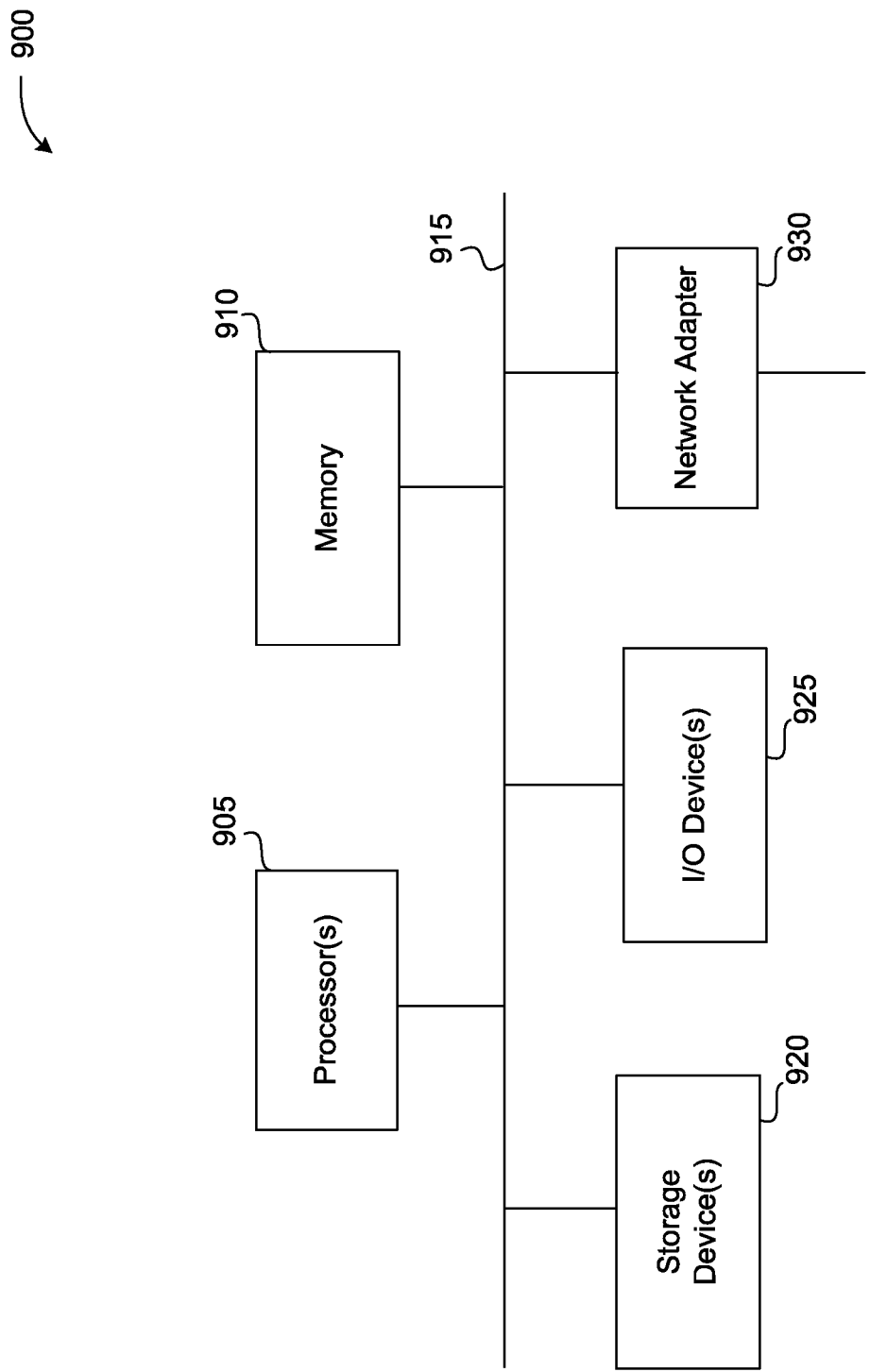
FIG. 9 is a block diagram of a computer system as may be used to implement features of some embodiments of the disclosed technology.

FIG. 9 is a block diagram of a computer system as may be used to implement features of some embodiments of the disclosed technology. The computing system 900 may be used to implement any of the entities, components or services depicted in the examples of FIGS. 1-8 (and any other components described in this specification). The computing system 900 may include one or more central processing units ("processors") 905, memory 910, input/output devices 925 (e.g., keyboard and pointing devices, display devices), storage devices 920 (e.g., disk drives), and network adapters 930 (e.g., network interfaces) that are connected to an interconnect 915. The interconnect 915 is illustrated as an abstraction that represents any one or more separate physical buses, point to point connections, or both connected by appropriate bridges, adapters, or controllers. The interconnect 915, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 910 and storage devices 920 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 910 can be implemented as software and/or firmware to program the processor(s) 905 to carry out actions described above. In some embodiments, such software or firmware may be initially provided to the processing system 900 by downloading it from a remote system through the computing system 900 (e.g., via network adapter 930).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

REMARKS

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method comprising:
    transmitting, by an image processing system, a request for response to a plurality of servers, for performing a task on a source image the performing including:
        retrieving, by one of the plurality of servers, the source image from an image store of a client system,
        processing, by the one of the plurality of servers, the source image to generate a first image, and
        feeding, by the one of the plurality of servers, the first image to the image processing system for further processing by the image processing system, the first image to be served as a processed image, by the image processing system, to a user device accessing content associated with the client system, the content including the processed image;
    receiving, by the image processing system and from at least a subset of the servers, a response from each server of the subset of the servers, the response including a corresponding score indicative of a match of the corresponding server to perform the task on the source image, the score determined as a function of a latency of the corresponding server, the latency being a time taken for a data packet to travel from the corresponding server to the image store and back to the corresponding server;
    sending, by the image processing system, a message to a first server of the subset of the servers to perform the task, the first server being the one of the plurality of servers having a first score that exceeds a predefined threshold or is highest among the scores, the first server being the one of the plurality of servers that is most proximate to the image store and having the least latency to the image store; and receiving, at the image processing system, the first image from the first server for further processing by the image processing system, the first image generated by the first server by performing the task on the source image.

2. The method of claim 1, wherein the first image is of a target size and the source image is of an original size, the target size being a file size of the first image, the original size being a file size of the source image, the target size being smaller than the original size.

3. The method of claim 2 further comprising:
processing, by the image processing system, the first image to generate a plurality of images based on a set of image processing instructions, the plurality of images being part of the content associated with the client system, the plurality of images associated with a corresponding image processing instruction of the set, the plurality of images including the processed image.

4. The method of claim 3 further comprising:
serving, by the image processing system, the processed image to the user device accessing the content.

5. The method claim 3, wherein the first image of the target size is an image of a lowest size of the source image using which the plurality of images is generated.

6. The method of claim 2, wherein the request for response includes the target size.

7. The method of claim 1, wherein sending the message to perform the task includes:
sending a first message to obtain the source image from the image store at the first server in an original size of the source image, the original size being a file size of the source image, and
sending a second message to the first server to downsize the source image to the first image having a first size, the first size being a file size of the first image, the first size being smaller than the original size.

8. The method of claim 7, wherein downsizing the source image to generate the first image includes decreasing a resolution of the source image.

9. The method of claim 1, wherein the score of each of the servers is determined as a function of a load of the corresponding server.

10. The method of claim 9, wherein the load of the corresponding server is determined as a function of a number of tasks being performed by the corresponding server and a size of the source image on which the corresponding task is being performed by the corresponding server.

11. The method of claim 1, wherein the score of each of the servers is determined as a function of latency between the corresponding server and the image store.

12. The method of claim 1, wherein the first server has a first latency with the image store and a second latency with the image processing system, the first latency being lower than the second latency.

13. The method of claim 1, wherein the image processing system has a first latency with the first server and a second latency with the image store, the first latency being lower than the second latency.

14. The method of claim 1, wherein the first server is geographically more proximate to the image store than the image processing system is to the image store.

15. The method of claim 1 further comprising:
receiving, at the image processing system and from the client system, a second request for a second image, the second request originating from the user device accessing content associated with the client system;
processing, by the image processing system, the first image to generate the second image based on a set of image processing instructions associated with the second image; and
presenting the second image to the user device to be displayed with the content.

16. A non-transitory computer-readable storage medium storing computer-readable instructions, comprising:
instructions for receiving, at a first server of a plurality of servers and from an image processing system, a request to send a downsized image of a source image stored at an image store of a client system to the image processing system;
instructions for determining, by the first server, a score of the first server, the score indicative of a match of the first server to service the request, the score determined as a function of a latency between the first server and the image store, the latency being a time taken for a data packet to travel from the first server to the image store and back to the first server;
instructions for sending, by the first server, the score to the image processing system;
instructions for receiving, at the first server and based on the score, a confirmation for servicing the request, the first server being one of the plurality of servers that is most proximate to the image store and having the least latency to the image store;
instructions for retrieving, by the first server and in response to receiving the confirmation, the source image from the image store in an original size of the source image stored at the image store, the original size being a file size of the source image;
instructions for processing, by the first server, the source image to generate the downsized image, the downsized image being of a first size, the first size being a file size of the first image, the first size being smaller than the original size; and
instructions for transmitting the downsized image to the image processing system.

17. The non-transitory computer-readable storage medium of claim 16, wherein the first server retrieves the source image from the image store over a first communication link and transmits the downsized image over a second communication link.

18. The non-transitory computer-readable storage medium of claim 17, wherein the first communication link has a first latency and the second communication link has a second latency, the first latency being lesser than the second latency.

19. The non-transitory computer-readable storage medium of claim 16, wherein the first server includes a list of image stores, and wherein the first server determines a latency between the first server and each image store of the list to generate a set of latencies for the first server.

20. The non-transitory computer-readable storage medium of claim 19, wherein the first server determines a set of scores based on the set of latencies, and wherein the first server transmits the set of scores to the image processing system.

21. The non-transitory computer-readable storage medium of claim 16, wherein each of a subset of the servers advertises their corresponding score to the image processing system based on a trigger.

22. The non-transitory computer-readable storage medium of claim 21, wherein the score of the first server is highest among scores of the subset of the servers.

23. The non-transitory computer-readable storage medium of claim 16, wherein the instructions for determining the score include instructions for determining the score as a function of (a) a latency between the first server and the image store and (b) a load of the first server.

24. The non-transitory computer-readable storage medium of claim 16, wherein the instructions for determining the score include instructions for determining the score as a function of computing resource required to service the request.

25. An apparatus comprising:
a processor;
a request dispatcher that works in cooperation with the processor to send a plurality of job requests to a plurality of servers for performing a job on a source image, the performing including:
  retrieving, by one of the plurality of servers, the source image from an image store of a client system,
  processing, by the one of the plurality of servers, the source image to generate a first image, and
  feeding, by the one of the plurality of servers, the first image to the image processing system for further processing by the image processing system;
a server determination unit that works in cooperation with the processor to determine a first server of the servers for performing the job on the source image based on a plurality of responses received from the servers for the job requests, the first server being the one of the plurality of servers that is determined based on a first score of the one of the plurality of servers, the first score satisfying a criterion for performing the job, the first score determined as a function of a latency between the first server and the image store, the latency being a time taken for a data packet to travel from the first server to the image store and back to the first server, the first server being the one of the plurality of servers that is most proximate to the image store and having the least latency to the image store,
wherein the request dispatcher is configured to send a message to the first server to perform the job; and
an image receiver that works in cooperation with the processor to receive a first image from the first server, where in the first image is a downsized version of the source image.

26. The apparatus of claim 25, wherein the server determination unit is configured to:
retrieve a plurality of scores of the servers from the responses, the scores indicative of a match of the servers to perform the job advertised, each of the scores determined by the corresponding server based on a latency of the corresponding server with the image store, and
identify a specified score of the scores that exceeds a predefined threshold as the first score.

27. The apparatus of claim 25, wherein the server determination unit is configured to:
retrieve a latency of each of the servers with the image store from the responses,
determine a score of each of the servers as a function of the latency of the corresponding server to generate a plurality of scores, the scores indicative of a match of the servers to perform the job advertised, and
identify a specified score of the scores that exceeds a predefined threshold as the first score.

28. The apparatus of claim 25 further comprising:
an image processor to generate a plurality of processed images to serve one or more of the processed images to an end user accessing content associated with the client system, the generating including processing the first image based on an a set of image processing instructions associated with the first image.

29. The apparatus of claim 25 further comprising:
a score determination unit to send a first message to each of the servers for determining a score of the corresponding server based on (a) a latency between the corresponding server and the image store, (b) a load of the corresponding server, and (c) computing resources of the corresponding server.

30. The apparatus of claim 25 further comprising:
a score determination unit to send a first message to each of the servers for determining a score of the corresponding server based on a number of downsizing jobs being performed by the corresponding server and a size of a specified source image which is being downsized in each of the downsizing jobs.

* * * * *